Figure 1:
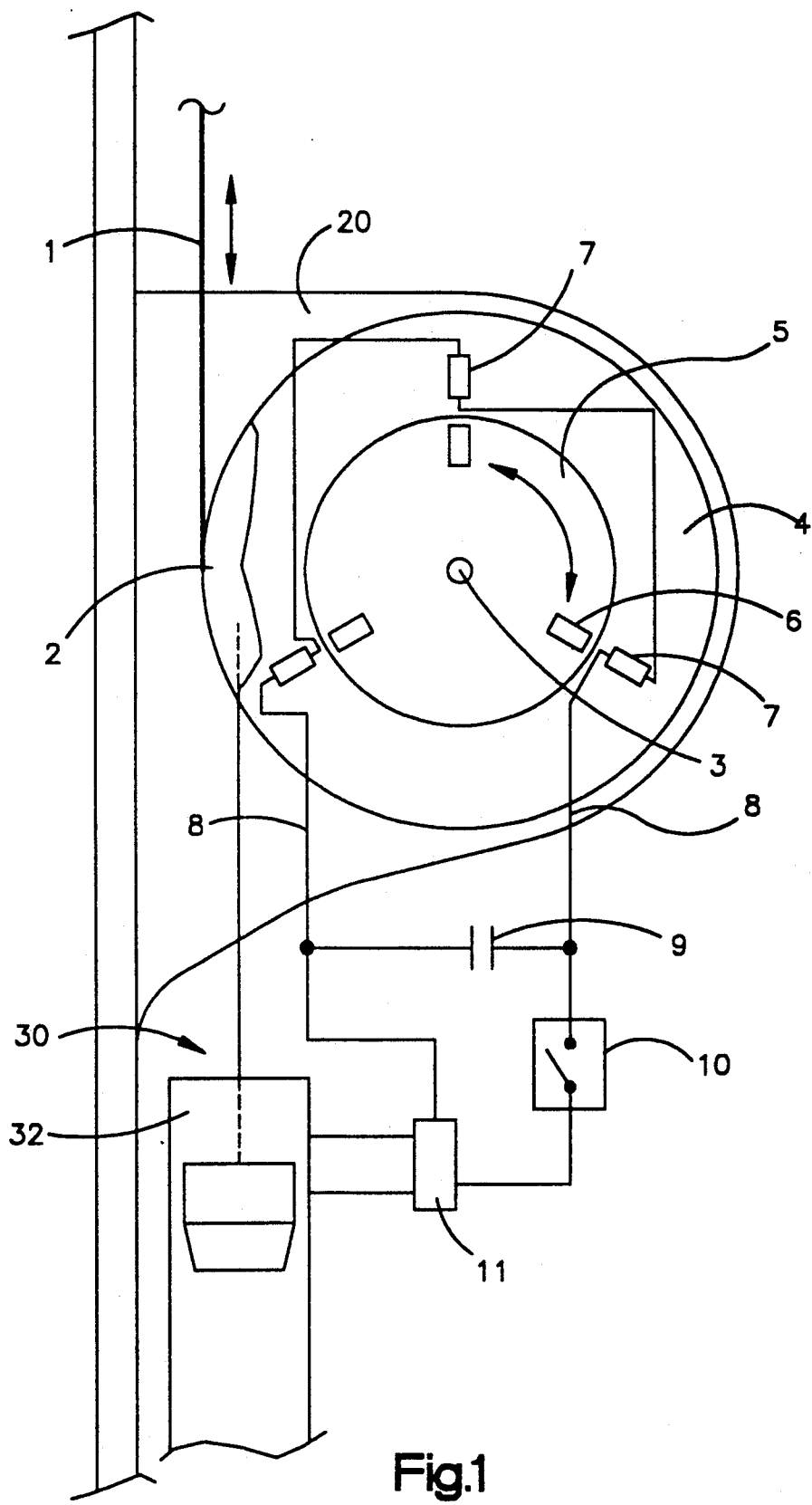

United States Patent [19]

Mödinger et al.

[11] Patent Number: 5,285,983
[45] Date of Patent: Feb. 15, 1994

[54] SAFETY BELT RETRACTOR FOR MOTOR VEHICLES

[75] Inventors: Thomas Mödinger, Alfdorf-Vordersteinenberg; Michael Stütz, Spraitbach, both of Fed. Rep. of Germany

[73] Assignee: TRW Repa GmbH, Alfdorf, Fed. Rep. of Germany

[21] Appl. No.: 987,126

[22] Filed: Dec. 8, 1992

[30] Foreign Application Priority Data

Dec. 10, 1991 [DE] Fed. Rep. of Germany ... 9115316[U]

[51] Int. Cl.⁵ .............................................. B60R 22/46
[52] U.S. Cl. .................................. 242/107; 280/806
[58] Field of Search ......... 242/107, 107.4 R, 107.4 A; 280/806; 297/478, 480

[56] References Cited

U.S. PATENT DOCUMENTS 3,967,794  7/1976  Fohl .............................. 242/107.4 R
4,700,974 10/1987  Andres et al. ...................... 280/806

Primary Examiner—John M. Jillions
Attorney, Agent, or Firm—Tarolli, Sundheim & Covell

[57] ABSTRACT

A safety belt retractor for motor vehicles comprises a belt spool (2) and a belt pretensioner (30), the pyrotechnical drive (32) of which is activatable via an electrical igniter (11) by means of an inertial sensor (10). The belt spool (2) is coupled to the rotor and the base member of the belt retractor to the stator of a current generator (3 to 7), the terminals of which are connected to a current collector (9) via a switch in the electrical igniter (11).

5 Claims, 1 Drawing Sheet

SAFETY BELT RETRACTOR FOR MOTOR VEHICLES

The present invention relates to a safety belt retractor for vehicles comprising a belt spool and a belt pretensioner, the pyrotechnical drive of which is activatable via an electrical igniter by means of an inertial sensor.

In vehicles equipped with such belt retractors a common central sensor is generally provided. An electrical line originating from the sensor leads to each belt retractor. The expenditure involved for the lines and laying them in the vehicle is considerable. Now, in motor vehicles various mechanical operations are however performed by the muscular force of the occupants and in many cases the energy developed is greater than the operation requires. The excess energy is wasted. Such an operation is the coiling and uncoiling of the webbing.

The invention provides a belt-retractor wherein hitherto unused excess of mechanical energy is converted into electrical energy and complex electrical lines are avoided. For this purpose the invention provides a safety belt retractor wherein the belt spool is coupled to the rotor and the base member of the belt retractor to the stator of an electrical current generator, the terminals of which are connected to a current collector via a switch actuated by the inertial sensor.

This makes it possible to usefully employ hitherto unused energy for electrical activation of the pyrotechnical drive of the belt tightener. The mechanical energy is utilized at the place of its formation, stored and employed in the immediate vicinity. No long cables are required and the overall arrangement is simple, economical and requires little space.

After the manufacture and prior to putting the belt retractor equipped according to the invention into operation, the current collector is preferably provided with an initial charge which suffices for the reliable triggering of the electrical igniter. The current generator then need only compensate the charge losses at the current collector due to time and may therefore be so weakly dimensioned that the easy moving of the belt spool is not noticeably impaired. The current collector, which may be an accumulator or a capacitor, collects the small amounts of energy accruing and makes them available when required in sufficient quantity to activate the pyrotechnical drive.

In a preferred embodiment, a mechanical sensor is used which is arranged directly at the belt retractor because the latter then forms an autonomous assembly together with the belt pretensioner.

In the single Figure of the drawing a preferred embodiment of the invention is illustrated schematically and will be described hereinafter.

The safety belt retractor comprises a base member 20 and a belt spool 2 rotatably mounted therein. Webbing 1 is shown which is wound onto and from a belt spool 2 of the belt retractor. A disc 5 is mounted on the shaft 3 of the belt spool 2 and is fixedly connected to the latter and represents the rotor of a current generator. It carries a plurality of permanent magnets 6 arranged in star array. Arranged coaxially therewith is a disc, preferably an annular disc 4, which in the Figure conceals the belt spool 2. The disc 4 is connected to the stator of the current generator and carries a plurality, for example three, coils 7 which are arranged in star manner and which are connected via lines 8 firstly to a current collector 9, for example an accumulator or a capacitor. The lines continue from the current collector 9 to an electrical igniter 11. A sensor 10 comprises an electrical switch and is preferably a mechanical sensor mounted directly on the belt retractor. The switch is connected into one of the lines 8 to the igniter 11 of a pyrotechnical drive.

A belt pretensioner is schematically shown at 30 in the Figure. It has a pryrotechnical drive 32 adapted to be activated by the electrical igniter 11.

On coiling and uncoiling the webbing 1 the belt spool 2 is rotated and via the shaft 3 thereof the rotor 5 is likewise rotated. In the cooperation of the magnets 6 and the coils 7 mechanical energy is converted to electrical current. The small quantities thereof are collected in the current collector 9 and consequently on response of the sensor 10 enough energy is available for firing the pyrotechnical drive. The entire device is very simple, economical and requires little space, due to the concentration at the location of the belt retractor. If the sensor 10 is a mechanical sensor, any connection to the central control can be dispensed with, thereby saving considerable line lengths. The reliable function of the pyrotechnical drive and thus of the belt tightener is nevertheless ensured.

What is claimed is:

1. A safety belt retractor for vehicles comprising:
   a base member;
   a belt spool rotatably mounted in said base member for coiling and uncoiling of belt webbing;
   a belt pretensioner having a pyrotechnical drive engaging said belt spool for rotating said belt spool in a belt coiling direction;
   an electrical ignitor for activating said pyrotechnical drive;
   an inertial sensor comprising a switch adapted to be closed upon sensing a vehicle deceleration exceeding a predetermined threshold;
   an electrical current generator having a stator connected to said base member and a rotor coupled to said belt spool;
   and an electrical current collector fed by said current generator;
   said electrical ignitor being connected to said current collector through said switch.

2. The safety belt retractor of claim 1, wherein said rotor comprises a flat disk carrying a plurality of permanent magnets.

3. The safety belt retractor of claim 2, wherein said stator comprises a flat annular disk coaxial with said rotor and carrying a plurality of coils.

4. The safety belt retractor of claim 1, wherein said inertial sensor is connected to said base member.

5. The safety belt retractor of claim 1, wherein said current generator is dimensioned for compensating loss of electrical charge in said current accumulator.

* * * * *